(12) United States Patent
Myung

(10) Patent No.: US 9,524,236 B1
(45) Date of Patent: Dec. 20, 2016

(54) SYSTEMS AND METHODS FOR PERFORMING MEMORY MANAGEMENT BASED ON DATA ACCESS PROPERTIES

(71) Applicant: MARVELL INTERNATIONAL LTD., Hamilton (BM)

(72) Inventor: Yun Chan Myung, Los Gatos, CA (US)

(73) Assignee: MARVELL INTERNATIONAL LTD., Hamilton (BM)

(*) Notice: Subject to any disclaimer, the term of this patent is extended or adjusted under 35 U.S.C. 154(b) by 43 days.

(21) Appl. No.: 14/591,631

(22) Filed: Jan. 7, 2015

Related U.S. Application Data

(60) Provisional application No. 61/925,579, filed on Jan. 9, 2014.

(51) Int. Cl.
  *G06F 12/00* (2006.01)
  *G06F 12/02* (2006.01)
  *G06F 12/08* (2016.01)
  *G06F 13/18* (2006.01)

(52) U.S. Cl.
  CPC ....... *G06F 12/0253* (2013.01); *G06F 12/0246* (2013.01); *G06F 12/0875* (2013.01); *G06F 13/18* (2013.01); *G06F 2212/452* (2013.01); *G06F 2212/702* (2013.01); *G06F 2212/7211* (2013.01)

(58) Field of Classification Search
  None
  See application file for complete search history.

(56) References Cited

U.S. PATENT DOCUMENTS

| | | | |
|---|---|---|---|
| 2006/0203546 A1* | 9/2006 | Lasser | G06F 12/0246 365/185.09 |
| 2007/0208906 A1* | 9/2007 | Ishimoto | G06F 12/0246 711/103 |
| 2011/0066882 A1* | 3/2011 | Walls | G06F 11/1068 714/6.24 |
| 2012/0254513 A1* | 10/2012 | Uehara | G06F 3/0616 711/103 |
| 2012/0317337 A1* | 12/2012 | Johar | G06F 12/0246 711/103 |
| 2014/0181432 A1* | 6/2014 | Horn | G06F 12/0253 711/159 |
| 2014/0244898 A1* | 8/2014 | Liu | G06F 12/126 711/103 |
| 2015/0074337 A1* | 3/2015 | Jo | G06F 12/0246 711/103 |

* cited by examiner

*Primary Examiner* — Kaushikkumar Patel

(57) ABSTRACT

Systems and methods are provided for performing memory management in a storage device. The systems and methods may include receiving, at the storage device, a command to perform an operation on a data segment, wherein the command includes an indication of access properties associated with the data segment. The systems and methods may further include determining a plurality of physical memory locations associated with the data segment, and performing memory management on the plurality of physical memory locations based on information about the access properties.

20 Claims, 7 Drawing Sheets

SYSTEMS AND METHODS FOR PERFORMING MEMORY MANAGEMENT BASED ON DATA ACCESS PROPERTIES

CROSS-REFERENCE TO RELATED APPLICATION

This disclosure claims the benefit under 35 U.S.C. §119(e) of U.S. Provisional Application No. 61/925,579, filed on Jan. 9, 2014, which is hereby incorporated by reference herein in its entirety.

FIELD OF USE

The present disclosure relates generally to systems and methods for performing memory management in storage devices and, more particularly, to a host interface that includes an indication of data access properties associated with segments of data stored in a storage device.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

Storage devices, such as those using flash technology, may use different granularities for writing and erasing data stored on the storage device. For example, data may be written in units of a "page," whereas data may only be erased in units of a "block." A block may include a plurality of pages. Erase operations may need to be performed in order to free up storage space that contains data that has become invalid, for example, because it belongs to a file deleted by a user. Even though the user may have deleted the file, some or all of the data associated with the file may remain stored on the storage device until it is overwritten or explicitly erased by the storage device. For instance, this may be the case when the deletion of a file by the user merely deletes a pointer to the file in a file system.

In order to free up storage space, storage devices may perform memory management, a process that may include so-called "garbage collection" and "wear-leveling." Garbage collection may refer to a process of consolidating information stored in blocks that contain both valid and invalid data pages. By moving the valid data pages of a block to other locations in the memory, the block may be erased without loss of data. This consolidation of data may generally reduce fragmentation in the sense that blocks containing only a small number of valid data pages are avoided. In some implementations, the process of garbage collection may have significant performance impact in terms of sustained performance and durability.

Wear-leveling may refer to the process of equalizing the number of times data pages are programmed and erased. In some aspects, certain memory technologies may allow data pages to only be programmed and erased for a predefined number of times, or program/erase (P/E) cycles. In order to improve the life span, durability, or robustness of a storage device, it may therefore be beneficial to evenly distribute the number of access operations, or P/E cycles, across data pages, such as to avoid scenarios in which certain data pages of the storage device becomes unusable before others.

SUMMARY OF THE DISCLOSURE

In accordance with an embodiment of the present disclosure, a method is provided for performing memory management in a storage device. The method includes receiving, at the storage device, a command to perform an operation on a data segment, wherein the command includes an indication of access properties associated with the data segment. The method further includes determining a plurality of physical memory locations associated with the data segment, and performing memory management on the plurality of physical memory locations based on information about the access properties.

In some implementations, the indication includes information about how frequently the data segment is expected to be accessed for at least one of reading or writing.

In some implementations, the indication includes at least one bit that determines whether the expected frequency of read operations exceeds a threshold.

In some implementations, the indication includes at least one bit that determines whether the expected frequency of write operations exceeds a threshold.

In some implementations, the data segment is a first data segment having a first access frequency, and the method further includes a second data segment having a second access frequency. The method may further perform memory management by caching the first data segment with higher priority than the second data segment if the first access frequency is higher than the second access frequency.

In some implementations, performing memory management may further include determining that the plurality of memory locations is associated with frequent read access but infrequent write access, and performing static wear-leveling on the plurality of memory locations in response to the determining.

In some implementations, performing memory management may further include determining that the plurality of memory locations is associated with frequent write access, and performing dynamic wear-leveling on the plurality of memory locations in response to the determining.

In some implementations, performing memory management may include performing garbage collection.

In accordance with an embodiment of the present disclosure, a system is provided for performing memory management in a storage device. The system may include storage circuitry that includes a plurality of physical memory locations, and control circuitry. The control circuitry may be configured to receive a command to perform an operation on a data segment, wherein the command includes an indication about access properties associated with the data segment. The control circuitry may further determine the plurality of physical memory locations associated with the data segment, and perform memory management on the plurality of physical memory locations based on information about the access properties.

In some implementations, the indication may further include information about how frequently the data segment is expected to be accessed for at least one of reading or writing.

In some implementations, the indication may further include at least one bit that determines whether the expected frequency of read operations exceeds a threshold.

In some implementations, the indication may further include at least one bit that determines whether the expected frequency of write operations exceeds a threshold.

In some implementations, the data segment is a first data segment having a first access frequency, and the system further includes a second data segment having a second access frequency. The control circuitry may further be configured to cache the first data segment with higher priority than the second data segment if the first access frequency is higher than the second access frequency.

In some implementations, the control circuitry may further be configured to perform memory management by determining that the plurality of memory locations is associated with frequent read access but infrequent write access, and performing static wear-leveling on the plurality of memory locations in response to the determining.

In some implementations, the control circuitry may further be configured to perform memory management by determining that the plurality of memory locations is associated with frequent write access, and performing dynamic wear-leveling on the plurality of memory locations in response to the determining.

In some implementations, performing memory management may include performing garbage collection.

BRIEF DESCRIPTION OF THE DRAWINGS

Further features of the disclosure, its nature and various advantages will be apparent upon consideration of the following detailed description, taken in conjunction with the accompanying drawings, in which like reference characters refer to like parts throughout, and in which.

DETAILED DESCRIPTION

Systems and methods are provided for performing memory management in a storage device. In particular, the performance of memory management procedures may be improved by including an indication of data access properties to commands of a host interface of a storage device. As used herein, "information" and "data" refer to any unit or aggregate of energy or signals that contain some meaning or usefulness.

Figure 1:
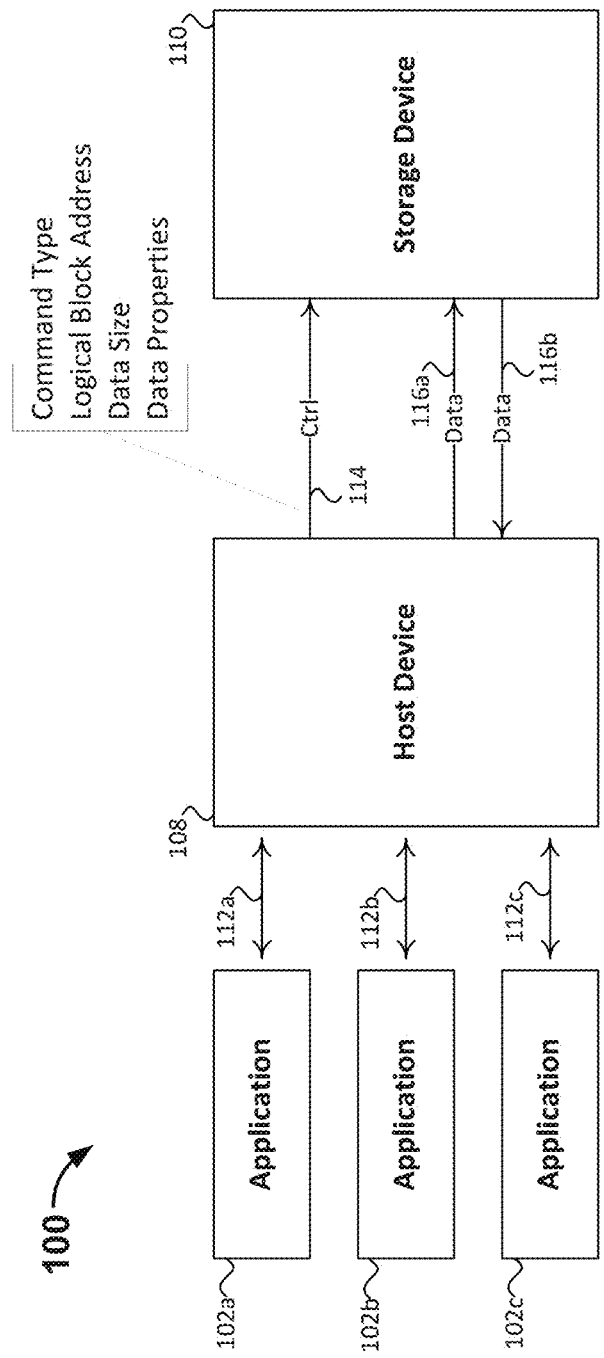
FIG. 1 shows an illustrative data storage system 100 that appends data access properties to commands of a host interface to improve memory management, in accordance with some embodiments of the present disclosure.

FIG. 1 shows an illustrative data storage system 100 that appends data access properties to commands of a host interface to improve memory management, in accordance with some embodiments of the present disclosure. Data storage system 100 may include a host device 108 and a storage device 110. Storage device 110 may use various types of memory technologies, such as hard disks (HDDs), flash memory, ROM/PROM/EPROM/EEPROM memory, or any other suitable kind of memory. Storage device 110 may further include static memory, which does not require to be periodically refreshed for retaining its stored contents, and dynamic memory, which does require such periodic refreshing. Host device 108 may correspond to a computing device that writes data to and reads data from storage device 110. Host device 108 may be coupled to other computing devices, or it may include software or firmware configured to execute various applications, such as applications 102a, 102b, and 102c (generally, application 102). Application 102 may generate data, which is subsequently written to storage device 110 through host device 108. Application 102 may also retrieve data from storage device 110 through host device 108. Application 102 may communicate with host device 108 through interfaces 112a-112c (generally interface 112).

Host device 108 may be coupled to storage device 110 through a control interface 114 and a data interface 116. Data interface 116 may operate in a forward direction using forward data interface 116a and in a reverse direction using reverse data interface 116b. In some embodiments, control interface 114 and data interface 116 may belong to a single input/output interface that supports both data and control transmissions. Information may be transferred across control interface 114 or data interface 116 using various technologies. For example, control interface 114 and data interface 116 may use a wired connection between host device 108 and storage device 110, but the connection may also be wireless, optical, or use any other suitable communications technique or communications channel.

In some embodiments, a plurality of different commands may be transmitted over control interface 114. Each command may include a number of parameters, such as a command type, a logical block address, a data size, and data properties. In some implementations, a command type may uniquely identify a command, such as a read or write operation. Depending on the command type, a set of additional parameters may be provided. For example, read or write commands may include at least one of the logical block address, data size, and data properties. The logical block address may refer to an address in a block of logical memory that may be used by host device 108 to identify memory segments. Storage device 110 may use the logical block address to determine physical memory locations in which the corresponding data is stored on storage device 110. A data size may refer to a the size of a block of data to which a command type refers. For example, a read command transmitted on control interface 114 may cause storage device 110 to retrieve a data block with a size corresponding to the value of the data size parameter and with a start address as indicated by the logical block address.

In some embodiments, some or all command types of control interface 114 may include additional data access properties that enable storage device 110 to improve memory management. These data access properties may include information on how often data segments to which the command relates are expected to be accessed as part of read and/or write operations.

In some embodiments, these data access properties may be used to improve memory management procedures on storage device 110. For example, data that is expected to be accessed frequently may be stored in different locations than data that is expected to be access infrequently. By organizing data in this way, memory management procedures may reduce the number of steps required to consolidate or defragment data stored on storage device 110. In other embodiments, the data access properties may be utilized to equalize the number of times that memory locations are programmed and erased (e.g., the number of program/erase or P/E cycles). For example, if a certain memory location has already been programmed and erased frequently (e.g., it has a high number of P/E cycles), then it may be advantageous to storage data in this memory location that is not expected to be accessed frequently. Conversely, if a specific memory location has a low number of P/E cycles, it may be suitable for storage of data that is expected to be accessed frequently.

Figure 2:
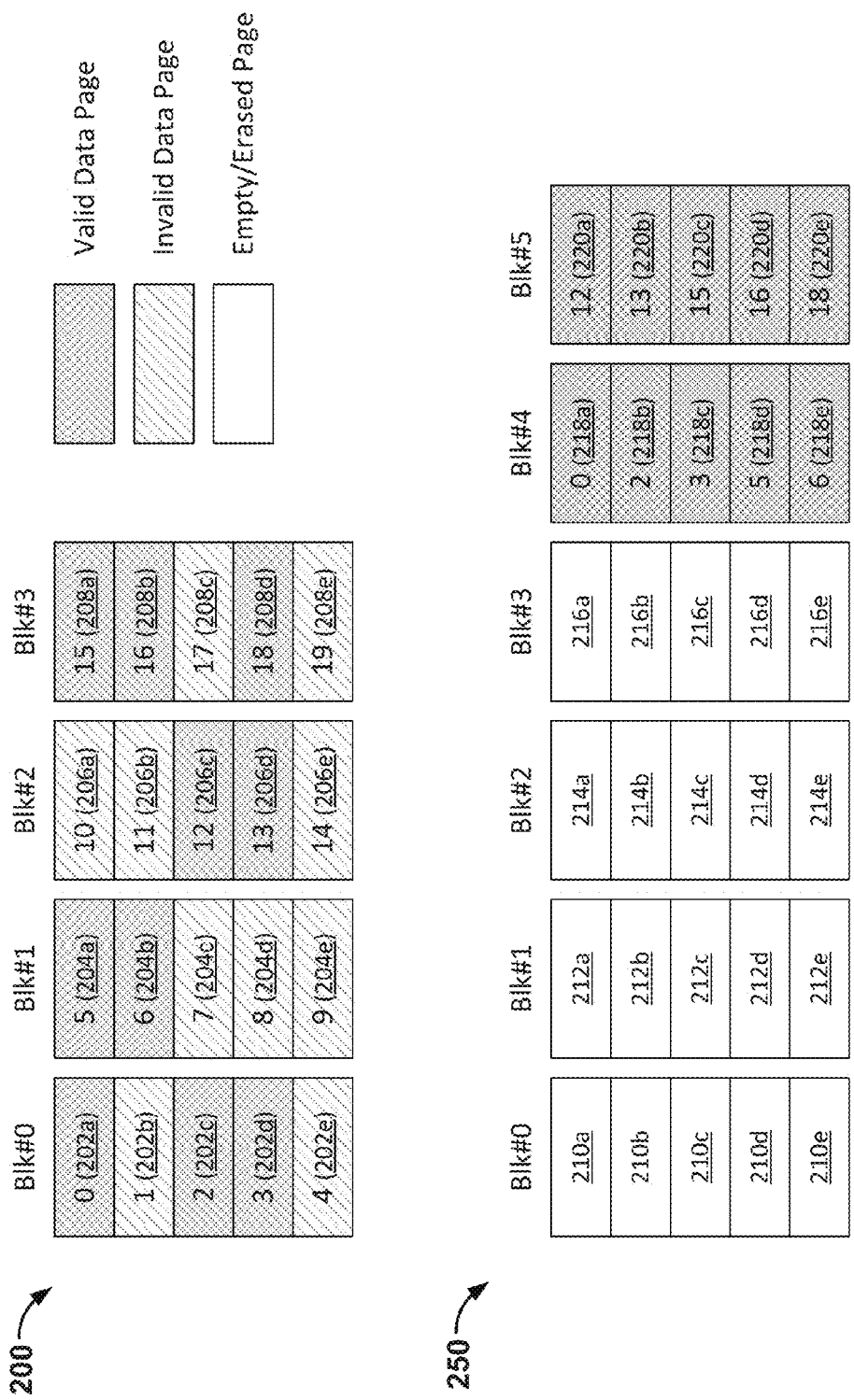
FIG. 2 shows an illustrative example of a memory management procedure, in accordance with some embodiments of the present disclosure.

FIG. 2 shows an illustrative example of a memory management procedure, in accordance with some embodiments of the present disclosure. The memory management procedure may be carried out on memory that is organized into blocks and pages. For example, a first memory segment 200 may consist of four blocks, and each of the blocks may in turn consist of five pages. For example, pages 202a-202e may correspond to block 202, pages 204a-204e may correspond to block 204, etc. In some embodiments, each of the pages may be assigned an index. For example, page 202a may be assigned index "0," page 202b may be assigned index "1," etc. The pages may be indexed across blocks. For example, page 204a may be assigned index "5," page 206a may be assigned index "10," and page 208a may be assigned index "15."

In some aspects, the pages of memory segment 200 may be associated with different status types. For example, some pages of memory segment 200, such as pages 202a, 202c, and 202d, may contain valid data, i.e., data that is available for retrieval from storage device 110 by host device 108. These pages may be referred to as valid data pages. Other pages, such as pages 202b and 202e, may contain invalid data, and may be referred to as invalid data pages. Pages containing invalid data may correspond to pages that previously stored valid data that has since become obsolete. For example, host device 108 may have previously written such data to storage device 110 but the corresponding data may since have become outdated and may not need be accessed again by host device 108. Although the data associated with pages containing invalid data may be obsolete, their content may not be have been reset to a predefined value, so that some information about the data may still be available in these pages.

In some embodiments, storage device 110 may only be able to perform erase operations with block-level granularity. Accordingly, it may not be feasible to erase invalid pages 202b and 202e of block 202 without also erasing valid pages 202a, 202c and 202d. Similarly, for block 204, it may not be possible to erase invalid pages 204c, 204d, and 204e without also erasing valid data pages 204a and 204b. In some aspects, invalid data pages may lead to increased fragmentation of storage device 110 and may require memory management procedures to defragment memory segment 200. For example, the information contained in valid data pages, such as valid data pages 202a, 202c and 202d, may need to be moved to different memory locations, thus rendering the original memory locations erasable. This process of consolidating valid data pages in as few block as possible is illustrated in memory segment 250.

Memory segment 250 may show the outcome of applying a memory management procedure to memory segment 200. Memory segment 250 may include the same blocks and pages as memory segment 200, such as blocks 210-216. Blocks 210, 212, 214, and 216 may correspond to the same physical blocks as blocks 202, 204, 206, and 208, but may illustrate the content of these blocks after the memory management procedure has been completed. In addition, memory segment 250 may include two additional blocks, blocks 218 and 220. Blocks 218 and 220 may be used to store the information contained in valid data pages previously stored in blocks 202-208. For example, the memory management procedure may move data stored in valid page 202a to valid page 218a, data stored in valid page 202c to valid page 218b, and data stored in valid page 202d to valid page 218c. Similarly, valid pages 204a and 204b may be moved to valid pages 218d and 218e, respectively.

In some embodiments, after the memory management procedure has consolidated valid pages in one or more blocks, the memory management procedure may erase blocks that no longer contain any valid data pages. For example, after moving valid pages 202a, 202c, and 202d, the memory management procedure may erase block 202, as shown in memory segment 250. Similarly, consolidating valid pages 204a and 204b of block 204 may allow the memory procedure to erase block 204, consolidating valid pages 206c and 206d may allow the memory management procedure to erase block 206, and consolidating valid pages 208a, 208b, and 208d may allow the memory procedure to erase block 208.

Upon completion of the memory management procedure, blocks 210-216 may have been erased and may consequently be empty. On the other hand, blocks 218 and 220 may contain only valid pages because blocks 218 and 220 consolidate all of the valid pages previously stored in blocks 202-208.

In some aspects, the foregoing memory management procedure may be referred to as garbage collection, because invalid pages are consolidated and erased to obtain an increased number of empty blocks that are available on storage device 110.

The performance of memory management procedures may be improved by moving valid data pages from blocks that contain as few valid data pages as possible. In particular, since each valid data page in a block needs to be moved prior to erasing the block, giving preference to blocks with few data pages enables a memory management process to clear a block of valid data pages faster by moving fewer blocks.

Figure 3:
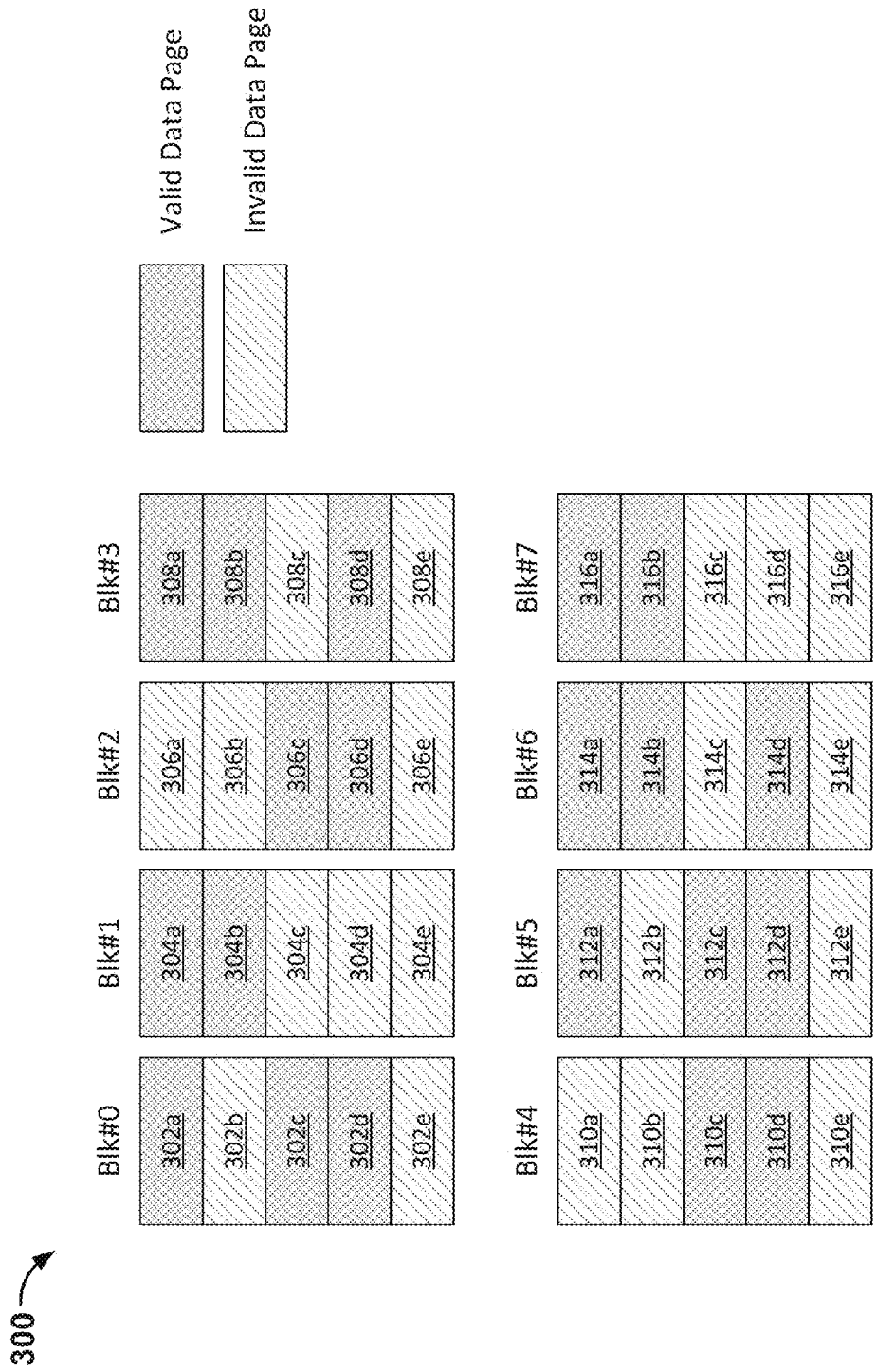
FIG. 3 shows an illustrative example of performing memory management when data access properties associated with stored data are unknown, in accordance with some embodiments of the present disclosure.

FIG. 3 shows an illustrative example of performing memory management when data access properties associated with stored data are unknown, in accordance with some embodiments of the present disclosure. As is discussed in relation to FIG. 2, the memory management procedure may be carried out on memory segments that are organized into blocks and pages. For example, memory segment 300 may consist of eight blocks 302-316. Each of blocks 302-316 may further include five pages. For example, block 302 may include pages 302a-302e, block 304 may include pages 304a-304e, etc. Similar to FIG. 2, some of the pages of memory segment 300 may be valid data pages while others may be invalid data pages. For example, the pages containing valid data may include valid data pages 302a, 302c, 302d, 304a, 304b, 306c, and 306d. The pages containing invalid data may include invalid data pages 302b, 302e, 304c, 304d, 304e, 306a, 306b, and 306e.

In some aspects, when data access properties of data stored on storage device 110 are unknown, the distribution of valid data pages and invalid data pages may be approximately uniform. Memory segment 300 may illustrate such a uniform distribution. Blocks 302-308 contain a total of ten valid data pages and a total of ten invalid data pages. Similarly, blocks 310-316 contain a total of ten valid data pages and a total of ten invalid data pages. As a result of this uniform distribution, it may be difficult for memory management procedures to identify blocks with a small number of valid data pages as target blocks (i.e., as the blocks from which valid data pages are moved) for consolidating valid data pages.

In some embodiments, when access properties associated with data stored on storage device 110 are unknown, memory management procedures may select a predetermined or randomly selected region of blocks for consolidating valid data pages. For example, among the blocks of memory segment 300, blocks 302-308 may be selected for moving valid data pages into different blocks. For the specific illustrative example shown in FIG. 3, the memory management procedure may move valid data pages 302*a*, 302*c*, 302*d*, 304*a*, 304*b*, 306*c*, 306*d*, 308*a*, 308*b*, and 308*d* to invalid data pages 310*a*, 310*b*, 310*e*, 312*b*, 312*e*, 314*c*, 314*e*, 316*c*, 316*d*, and 316*e*, respectively. The total number of valid data pages that may need to be moved is ten in this example, which may correspond to the average number of valid data pages per block.

Figure 4:
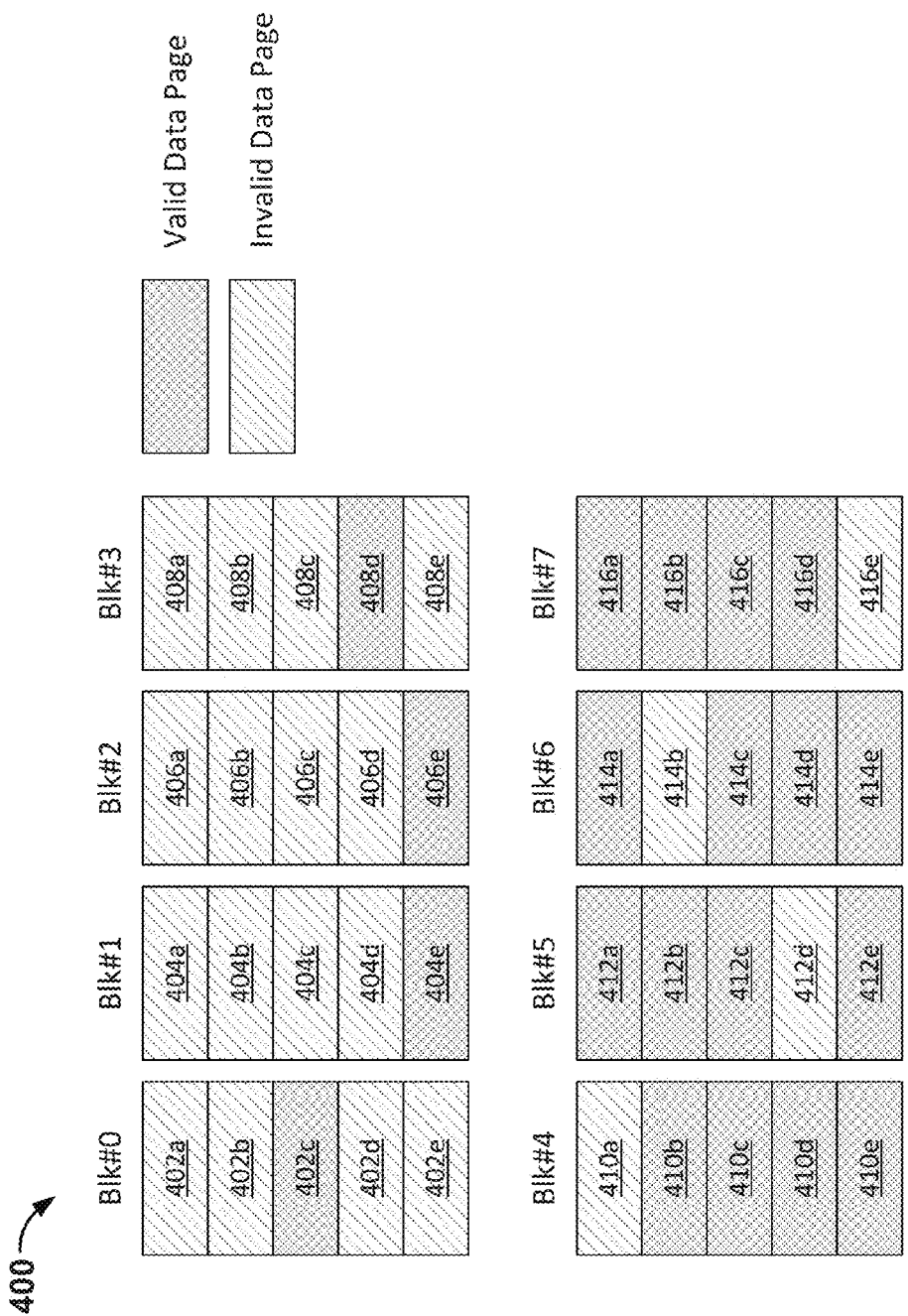
FIG. 4 shows an illustrative example of performing memory management based on data access properties associated with stored data, in accordance with some embodiments of the present disclosure.

FIG. 4 shows an illustrative example of performing memory management based on data access properties associated with stored data, in accordance with some embodiments of the present disclosure. As is discussed in relation to FIG. 2, memory management may be carried out on memory segments that are organized into blocks and pages. For example, similar to memory segment 300, memory segment 400 may consist of eight blocks 402-416. Each of blocks 402-416 may further include five pages. For example, block 402 may include pages 402*a*-402*e*, block 404 may include pages 404*a*-404*e*, etc. Similar to FIG. 3, some of the pages of memory segment 300 may contain valid data while others may contain invalid data. For example, block 402 may include valid data page 402*c*, block 404 may include valid data page 404*e*, block 406 may include valid data page 406*e*, and block 408 may include valid data page 408*d*.

In some embodiments, when data access properties associated with stored data are known, storage device 110 may group data with similar access properties in specific blocks. Such grouping may result in a non-uniform distribution of valid data pages per block. For example, as shown by the illustrative example of FIG. 4, blocks 402-408 may contain a total of only four valid data pages (i.e., valid data pages 402*c*, 404*e*, 406*e*, and 408*d*), whereas blocks 410-416 may contain a total of 16 valid data pages (i.e., valid data pages 410*b*-410*e*, 412*a*-412*c*, 412*e*, 414*a*, 414*c*-414*e*, and 416*a*-416*d*). Memory management procedures may exploit this non-uniform distribution in order to enhance memory management performance. For example, the memory management procedure may select blocks 402-408 as target blocks for consolidating valid data pages 402*c*, 404*e*, 406*e*, and 408*d*. In this way, blocks 402-408 may be erased by the memory management procedure by only moving a total of four valid data pages. In contrast, as is discussed in relation to FIG. 3, a total of ten valid data pages needed be moved when the access properties of the stored data were unknown.

In some embodiments, data access properties may correspond to an expected frequency of read or write operations. For example, the data properties may include a number of read or write operations expected to occur during a predefined time period. In some implementations the expected number of read or write operations may be quantized according to predefined or dynamic intervals. For example, the expected frequency of read or write operations may simply be classified as "high" or "low": if the expected number of read operations exceeds a threshold, the access frequency may be designated as high; otherwise, it may be designated as low. In some implementations, separate indications may be provided for read and write operations, respectively. For example, one bit may be used to indicate whether the expected frequency of read operations is high or low, and another bit may be used to indicate whether the expected frequency or write operations is high or low.

In some embodiments, an indication of data access properties may be appended to suitable commands of a host interface used in connection with storage device 110. Accordingly, because the indication of the data access properties is appended to a command, the access properties may implicitly be associated with target addresses to which the command corresponds. For example, when a certain block of data is transferred from host device 108 to storage device 110 as part of a write operation, an indication of the access properties may be appended. When storage device 110 receives the command from host device 108, it may implicitly assume that the indication of the data access properties refers to the block of data that is to be written on storage device 110. In other embodiments, access properties may be received by storage device 110 independently from data to which the data access properties belong. For example, data access properties may be transferred from host device 108 to storage device 110 in bulk at predetermined times. In some implementations, when data access properties are transferred independently of the data with which they are associated, a target address may be included. In that way the access properties may be associated with specific target addresses on storage device 110. The target address may correspond to a logical memory space used by host device 108, a physical address space used by storage device 110, or may correspond to any other suitable indication of a memory address.

In some embodiments, the thresholds associated with selecting a "high" versus a "low" access frequency may depend on the memory size of storage device 110 or they may depend on the size of a cache used by storage device 110. In some embodiments, host device 108 may submit a query to storage device 110 to retrieve these parameters and may determine the thresholds based on these values. A policy used by host device 108 for setting the thresholds may take these parameters into account to trade off performance and durability of storage device 110.

In some embodiments, memory management procedures may further seek to equalize a number of program and erase (P/E) cycles associated with memory locations (e.g., blocks or pages) of storage device 110. For some storage technologies, memory locations may only be programmed and erased for a predetermined number of times. In order to increase the reliability of data storage and the durability of storage device 110, it may be desirable to equalize the number of P/E cycles across memory locations of storage device 110. In this context, memory management procedures may utilize data access properties to preferably store data that are expected to be accessed frequently in memory locations with a low number of P/E cycles and vice versa. This process may be referred to as wear-leveling.

In some implementations, wear-leveling may be classified into static wear-leveling and dynamic wear-leveling. Static wear-leveling may be performed in the background, i.e., not in relation to a current write or read command. As part of preforming static wear-leveling, memory locations that have frequently been read from may be identified. In some implementations, such memory locations may suffer a decrease in storage reliability. The decrease in reliability may be compensated by rewriting the data to a different memory location and erasing the original memory location, such as to "refresh" the memory location. Static wear-leveling may benefit from information about data access properties because it may better identify memory locations that have frequently been read from, e.g., by grouping the data in blocks based on the data access properties.

In some embodiments, dynamic wear-leveling may be performed in relation to an ongoing read or write command. For example, dynamic wear-leveling may seek to equalize the number of P/E cycles across memory locations. Accordingly, the data access properties may be used to store data that are expected to be accessed frequently in memory locations with a small number of P/E cycles. Conversely, data that are expected to be accessed infrequently may be stored in memory locations associated with a larger number of P/E cycles.

Figure 5:
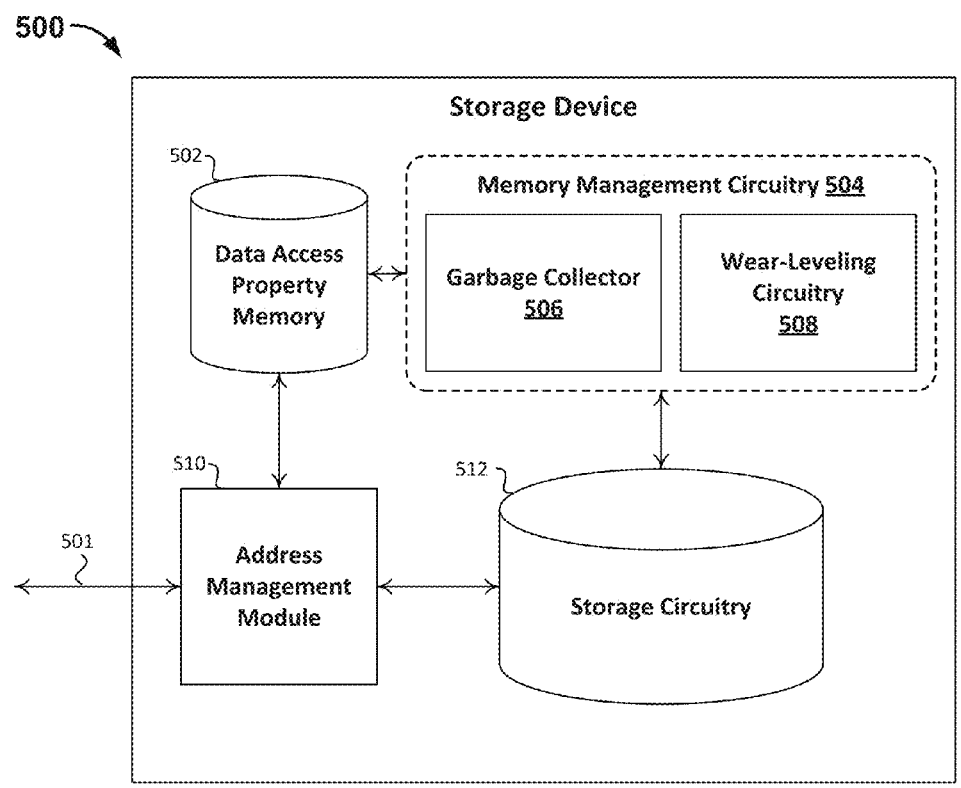
FIG. 5 shows an illustrative block diagram of a storage device that performs memory management based on data access properties associated with stored data, in accordance with some embodiments of the present disclosure.

FIG. 5 shows an illustrative block diagram of a storage device 500 that performs memory management based on data access properties associated with stored data, in accordance with some embodiments of the present disclosure. Storage device 500 may be similar to storage device 110 discussed in relation to FIG. 1. Storage device 500 may receive data and control inputs, and provide data and control outputs, such as through an input/output host interface 501. For example, input/output host interface 501 may connect storage device 500 to a host device, such as host device 108. Storage device 500 may include a data access property memory 502, memory management circuitry 504, an address management module 510, and storage circuitry 512.

Storage device 500 may receive data and control commands from a host device through host interface 501. Host interface 501 may use various formats for exchanging data and control commands. For example, host interface 501 use various standardized interface protocols, such as Serial ATA, Serial attached SCSI, or NVM Express. Alternatively, host interface 501 may follow a proprietary format, which may be the case when host device 108 and storage device 110 are implemented by a common vendor, or when host device 108 and storage device 110 are both integrated in a single device. In some implementations, some components of host interface 501 may be standardized while other components may follow a proprietary format. For example, host interface 501 may use commands of a standardized interface but add additional proprietary information that may be used by certain storage devices that additionally support the proprietary format.

Control or data commands received through host interface 501 may be processed by address management module 510. In some embodiments, control and data commands exchanged over host interface 501 may contain logical address information that is used by host device 108 to identify specific memory locations. However, the corresponding data may be stored in a different arrangement on storage device 500. Address management module 510 may translate logical addresses received via host interface 501 to physical addresses that identify specific memory locations on storage circuitry 512.

In some embodiments, once address management module 510 has converted the logical addresses provided by host interface 501 to physical addresses useable in connection with storage circuitry 512, storage device 500 may store the received data in a plurality of memory locations on storage circuitry 512. Storage circuitry 512 may corresponds to various types of physical storage, including volatile and non-volatile storage types. It should be understood that storage circuitry 512 may correspond to a combination of various storage types (e.g., both volatile and non-volatile storage) without departing from the scope of the present disclosure.

In some embodiments, host interface 501 may include data access properties associated with data stored or to be stored on storage device 500. The received access properties may be extracted by address management module 510, and the data access properties may be stored in access property memory 502. Access property memory may associate the access properties with their respective data. For example, address management module 510 may store, upon converting logical addresses contained in a control or data transmission to physical memory locations, both the received data access properties and their corresponding physical memory locations in access property memory 502. In some implementations, the data access properties may be associated implicitly with their respective memory locations. For example, a location within access property memory 502, at which a given set of data properties are stored, may implicitly determine to which physical memory locations the access properties belong.

Storage device 500 may further include memory management circuitry 504. Memory management circuitry may perform memory management on storage circuitry 512 using the data access properties stored in data access property memory 502. In some embodiments, memory management circuitry 504 may include garbage collector 506 and wear-leveling circuitry 508. As is discussed in relation to FIGS. 2-4, garbage collector 506 may group data with similar data access properties and store it in designated or predefined blocks. For example, data with similar data access properties may be stored in neighboring blocks. In this way, the expected distribution of valid data pages in blocks may be better predicted by memory management circuitry 504. This may lead to improved memory management performance because fewer valid data pages may need to consolidated as part of the memory management procedure or garbage collection process.

In some embodiments, memory management circuitry 504 may perform wear-leveling based on the access properties associated with the data stored or to be stored on storage device 500. For example, based on the access properties, blocks or pages with a large expected frequency of read operations may be identified. In some implementations, frequent read access of a valid data page may lead to instability of the stored information and possibly to a loss of the stored information. Additionally or alternatively, frequent write access to a data or page may lead to decreased reliability over time, because a block or page may only be utilized for a predetermined number of program/erase (P/E) cycles in some memory technologies. Accordingly, wear-leveling circuitry 508 may determine to store data received from host interface 501 in physical memory locations such as to equalize the number of program/erase cycles. For example, if a specific memory location, such as a block or page, has already been subject to a fairly large number of P/E cycles, wear-leveling circuitry 508 may determine that data with a relatively low expected number of read or write accesses should be stored there, rather than data that is expected to be frequently accessed. In this way, wear-leveling circuitry 508 may enhance the durability of storage device 500 by equalizing the number of P/E cycles across blocks or pages of storage circuitry 512.

Figure 6:
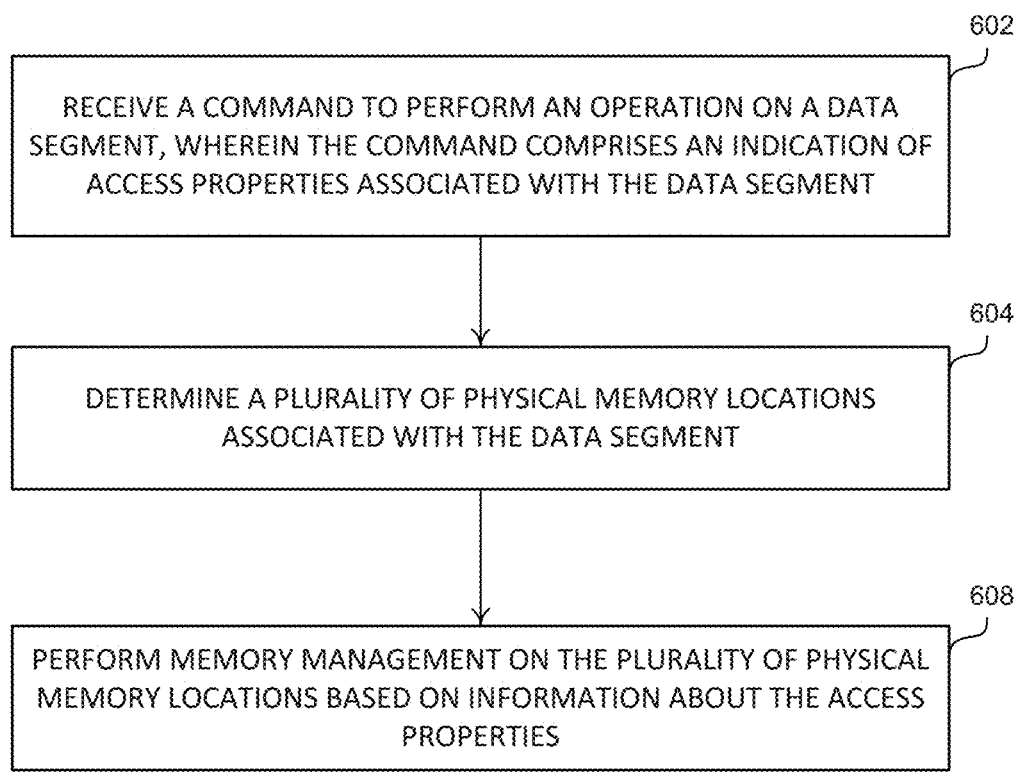
FIG. 6 shows a high-level flow chart of a process for performing memory management in a storage device, in accordance with some embodiments of the present disclosure.

FIG. 6 shows a high-level flow chart of a process 600 for performing memory management in a storage device, in accordance with some embodiments of the present disclosure. Storage device 110 may execute process 600 by, at 602, receiving a command to perform an operation on a data segment, wherein the command comprises an indication of access properties associated with the data segment. At 604, process 600 may determine a plurality of physical memory locations associated with the data segment. At 608, process 600 may perform memory management on the plurality of physical memory locations based on the stored information about the access properties.

At 602, process 600 may receive a command to perform an operation on a data segment. In some embodiments, the command may be received by a storage device, such as storage device 110 or storage device 500. The command may be received by the storage device through a host interface, such as host interface 501. The command may include an identifier that uniquely identifies the type of command as well as parameters that may be used by the storage device to execute the command. For example, the command may be a read command or a write command, and the additional parameters may include a start address in a logical address space, a block size of the data segment to be written to or read from the storage device. In some implementations, the command may further include access properties associated with the data with respect to which the command is to be executed. For example, if the command pertains to a write operation, the access properties associated with the data to be written to storage device 500 may be included. In some implementations the access properties may correspond to an expected frequency of read or write operations for the data. Information about the access properties may be encoded in various forms and appended to the other parameters of the command. For example, in some implementations, the expected frequency of read or write operations may be classified as "high" or "low," respectively. In other implementations, the expected frequency of read or write operations may be quantized according to a predefined or dynamic number of intervals. In yet another implementation, the expected frequency of read or write operations may be encoded as a floating point or integer number.

At 604, process 600 may determine a plurality of physical memory locations associated with the data segment. In some embodiments, a storage device, such as storage device 500, may determine the plurality of physical memory locations using address management module 510. Address management module 510 may extract information from the received command, which may include information about a set of logical addresses used by host interface 501 (e.g., logical addresses used by host device 108). Address management module 510 may identify physical memory locations based on the logical addresses by using a mapping, such as a lookup table.

Process 600 may store information about the access properties of the data segment. In some embodiments, storage device 500 may store the access properties in data access property memory 502. Data access property memory 502 may be organized in various ways. The data access properties may be stored such that they are indexed by either logical addresses or physical memory locations. For example, storage device 500 may associate a pointer with each logical memory address that points to data access properties pertaining to the data stored at that address. Additionally or alternatively, storage device 500 may store the data access properties such that they are indexed by physical memory location. For example, storage device 500 may associate a pointer with each physical memory location that points to data access properties pertaining to that physical memory location.

At 608, process 600 may perform memory management on the plurality of physical memory locations based on the stored information about the access properties. In some embodiments, storage device 500 may perform the memory management using memory management circuitry 504. Memory management circuitry 504 may include garbage collector 506 and wear-leveling circuitry 508. Memory management circuitry 504 may retrieve the data access properties from data access property memory 502.

In some implementations, garbage collector 506 may use data access properties retrieved from data access property memory 502 to select target blocks for consolidating valid data pages. For example, the data access properties may be used to identify memory locations that likely contain a small number of valid data pages. Garbage collector 506 may therefore preferably use the identified target blocks with few valid data pages for consolidation.

Wear-leveling circuitry 508 may utilize the data access properties retrieved from data access property memory 502 to identify memory locations for storing data such that the number of P/E cycles across memory locations is equalized. In some implementations, memory locations may only be programmed and erased for a predetermined number of times before storage reliability is compromised. Accordingly, if a specific memory location has already incurred a large number of P/E cycles, it may be preferable to store data in such a memory location that is not expected to be accessed frequently. Conversely, if a specific memory location has a low number of P/E cycles, it may be a suitable memory location for storing data that is expected to be accessed frequently.

Figure 7:
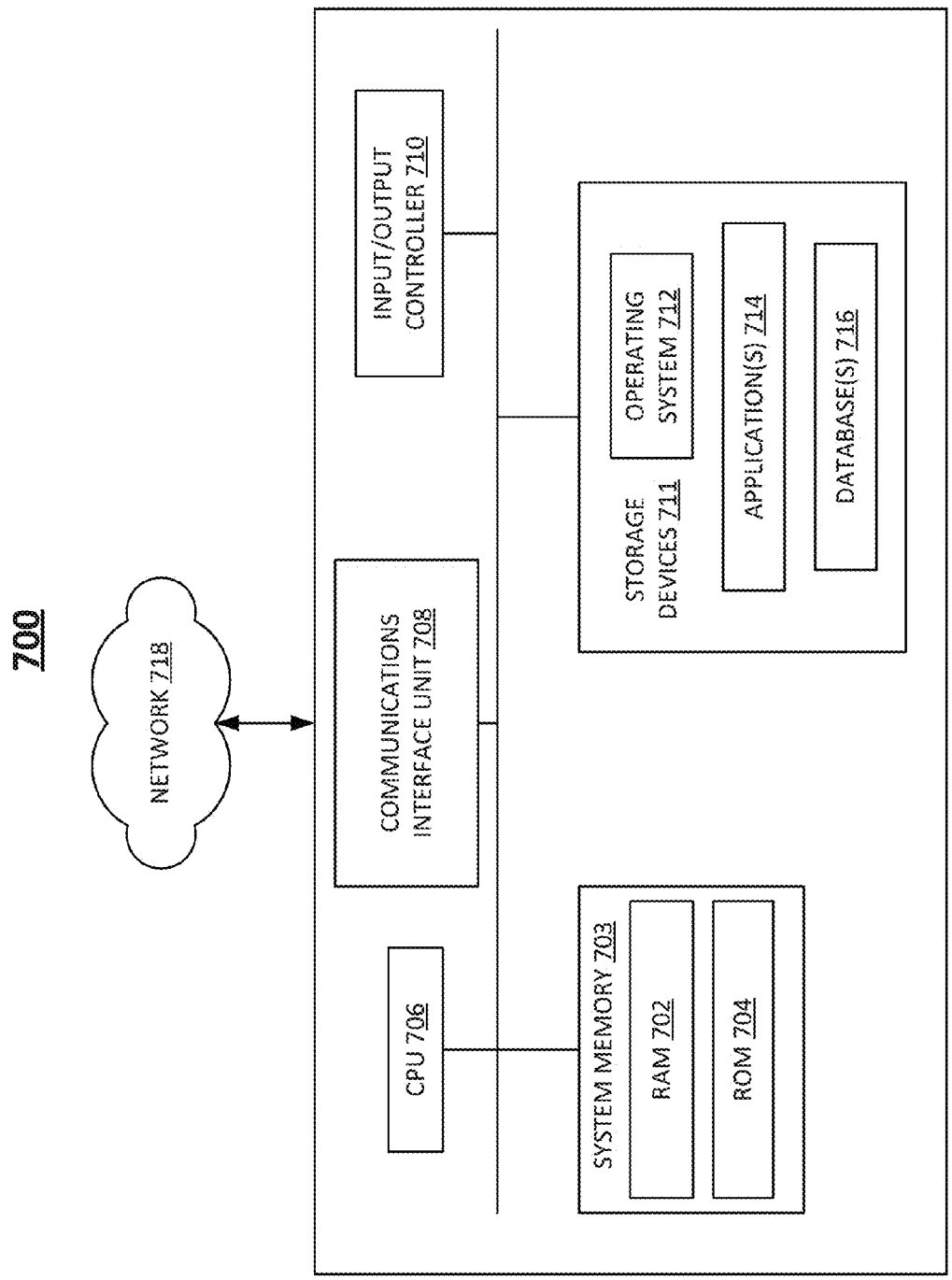
FIG. 7 shows a block diagram of a computing device, for performing any of the processes described herein, in accordance with some embodiments of the present disclosure.

FIG. 7 is a block diagram 700 of a computing device, such as any of the user equipment devices of FIG. 1, for performing any of the processes described herein, in accordance with an embodiment of the disclosure. Each of the components of these systems may be implemented on one or more computing devices 700. In certain aspects, a plurality of the components of these systems may be included within one computing device 700. In certain embodiments, a component and a storage device 711 may be implemented across several computing devices 700.

The computing device 700 comprises at least one communications interface unit 708, an input/output controller 710, system memory 703, and one or more data storage devices 711. The system memory 703 includes at least one random access memory (RAM 702) and at least one read-only memory (ROM 704). All of these elements are in communication with a central processing unit (CPU 706) to facilitate the operation of the computing device 700. The computing device 700 may be configured in many different ways. For example, the computing device 700 may be a conventional standalone computer, or, alternatively, the functions of computing device 700 may be distributed across multiple computer systems and architectures. In FIG. 7, the computing device 700 is linked, via network 718 or local network, to other servers or systems.

The computing device 700 may be configured in a distributed architecture, wherein databases and processors are housed in separate units or locations. Some units perform primary processing functions and contain at a minimum a general controller or a processor and a system memory 703. In distributed architecture embodiments, each of these units may be attached via the communications interface unit 708 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to Ethernet, SAP, SAS™, ATP, BLUETOOTH™, GSM and TCP/IP.

The CPU 706 comprises a processor, such as one or more conventional microprocessors and one or more supplementary co-processors such as math co-processors for offloading workload from the CPU 706. The CPU 706 is in communication with the communications interface unit 708 and the input/output controller 710, through which the CPU 706 communicates with other devices such as other servers, user terminals, or devices. The communications interface unit 708 and the input/output controller 710 may include multiple communication channels for simultaneous communication with, for example, other processors, servers or client terminals.

The CPU 706 is also in communication with the data storage device 711. The data storage device 711 may comprise an appropriate combination of magnetic, optical or semiconductor memory, and may include, for example, RAM 702, ROM 704, a flash drive, an optical disc such as a compact disc, or a hard disk or drive. The CPU 706 and the data storage device 711 each may be, for example, located entirely within a single computer or other computing device, or connected to each other by a communication medium, such as a USB port, serial port cable, a coaxial cable, an Ethernet cable, a telephone line, a radio frequency transceiver or other similar wireless or wired medium or combination of the foregoing. For example, the CPU 706 may be connected to the data storage device 711 via the communications interface unit 708. The CPU 706 may be configured to perform one or more particular processing functions.

The data storage device 711 may store, for example, (i) an operating system 712 for the computing device 700; (ii) one or more applications 714 (e.g., a computer program code or a computer program product) adapted to direct the CPU 706 in accordance with the systems and methods described here, and particularly in accordance with the processes described in detail with regard to the CPU 706; or (iii) database(s) 716 adapted to store information that may be utilized to store information required by the program.

The operating system 712 and applications 714 may be stored, for example, in a compressed, an uncompiled and an encrypted format, and may include computer program code. The instructions of the program may be read into a main memory of the processor from a computer-readable medium other than the data storage device 711, such as from the ROM 704 or from the RAM 702. While execution of sequences of instructions in the program causes the CPU 706 to perform the process steps described herein, hardwired circuitry may be used in place of, or in combination with, software instructions for embodiment of the processes of the present disclosure. Thus, the systems and methods described are not limited to any specific combination of hardware and software.

Suitable computer program code may be provided for performing one or more functions in relation to synchronization signal acquisition as described herein. The program also may include program elements such as an operating system 712, a database management system and "device drivers" that allow the processor to interface with computer peripheral devices (e.g., a video display, a keyboard, a computer mouse, etc.) via the input/output controller 710.

The term "computer-readable medium" as used herein refers to any non-transitory medium that provides or participates in providing instructions to the processor of the computing device 700 (or any other processor of a device described herein) for execution. Such a medium may take many forms, including, but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, a hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer may read.

Various forms of computer-readable media may be involved in carrying one or more sequences of one or more instructions to the CPU 706 (or any other processor of a device described herein) for execution. For example, the instructions may initially be borne on a magnetic disk of a remote computer (not shown). The remote computer may load the instructions into its dynamic memory and send the instructions over an Ethernet connection, cable line, or even telephone line using a modem. A communications device local to a computing device 700 (e.g., a server) may receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

The foregoing is merely illustrative of the principles of this disclosure, and various modifications can be made without departing from the scope of the present disclosure. The above described embodiments of the present disclosure are presented for purposes of illustration and not of limitation, and the present disclosure is limited only by the claims that follow.

What is claimed is:

1. A method for performing memory management in a storage device, the method comprising:
  receiving, at the storage device, a command to perform an operation on a data segment, wherein the command comprises an indication of access properties associated with the data segment, and wherein:

the indication comprises at least one bit that indicates whether an expected access frequency of the data segment exceeds a threshold, and
the threshold is determined, at least in part, by querying a parameter of the storage device;
determining a plurality of physical memory locations associated with the data segment; and
performing memory management on the plurality of physical memory locations based on information about the access properties.

2. The method of claim 1, wherein the indication comprises information about how frequently the data segment is expected to be accessed for at least one of reading or writing.

3. The method of claim 1, wherein the indication determines whether an expected frequency of read operations exceeds a threshold.

4. The method of claim 1, wherein the indication determines whether an expected frequency of write operations exceeds a threshold.

5. The method of claim 1, wherein determining the plurality of physical memory locations comprises:
translating a plurality of logical memory locations to the plurality of physical memory locations.

6. The method of claim 1, wherein the command to perform an operation on the data segment is at least one of a read command and a write command.

7. The method of claim 1, wherein the data segment is a first data segment having a first access frequency, the method further comprises a second data segment having a second access frequency, and performing memory management comprises:
caching the first data segment with higher priority than the second data segment if the first access frequency is higher than the second access frequency.

8. The method of claim 1, wherein performing memory management comprises:
determining that the plurality of physical memory locations is associated with frequent read access but infrequent write access; and
performing static wear-leveling on the plurality of memory locations in response to the determining.

9. The method of claim 1, wherein performing memory management comprises:
determining that the plurality of physical memory locations is associated with frequent write access; and
performing dynamic wear-leveling on the plurality of memory locations in response to the determining.

10. The method of claim 1, wherein performing memory management comprises performing garbage collection.

11. A system for performing memory management in a storage device, the system comprising:
storage circuitry comprising a plurality of physical memory locations; and
control circuitry configured to:
receive a command to perform an operation on a data segment, wherein the command comprises an indication about access properties associated with the data segment, and wherein:
the indication comprises at least one bit that indicates whether an expected access frequency of the data segment exceeds a threshold, and
the threshold is determined, at least in part, by querying a parameter of the storage device;
determine the plurality of physical memory locations associated with the data segment; and
memory management circuitry configured to perform memory management on the plurality of physical memory locations based on information about the access properties.

12. The system of claim 11, wherein the indication comprises information about how frequently the data segment is expected to be accessed for at least one of reading or writing.

13. The system of claim 11, wherein the indication determines whether an expected frequency of read operations exceeds a threshold.

14. The system of claim 11, wherein the indication determines whether an expected frequency of write operations exceeds a threshold.

15. The system of claim 11, wherein the control circuitry is configured to determine the plurality of physical memory locations by being further configured to:
translate a plurality of logical memory locations to the plurality of physical memory locations.

16. The system of claim 11, wherein the command to perform an operation on the data segment is at least one of a read command and a write command.

17. The system of claim 11, wherein the data segment is a first data segment having a first access frequency, the system further comprises a second data segment having a second access frequency, and the control circuitry is further configured to:
cache the first data segment with higher priority than the second data segment if the first access frequency is higher than the second access frequency.

18. The system of claim 11, wherein the control circuitry is configured to perform memory management by being further configured to:
determine that the plurality of physical memory locations is associated with frequent read access but infrequent write access; and
perform static wear-leveling on the plurality of physical memory locations in response to the determining.

19. The system of claim 11, wherein the control circuitry is configured to perform memory management by being further configured to:
determine that the plurality of physical memory locations is associated with frequent write access; and
perform dynamic wear-leveling on the plurality of physical memory locations in response to the determining.

20. The system of claim 11, wherein performing memory management comprises performing garbage collection.

* * * * *